A. RUTHERFORD.
Adjustable Trace-Fastening.
No. 203,780. Patented May 14, 1878.
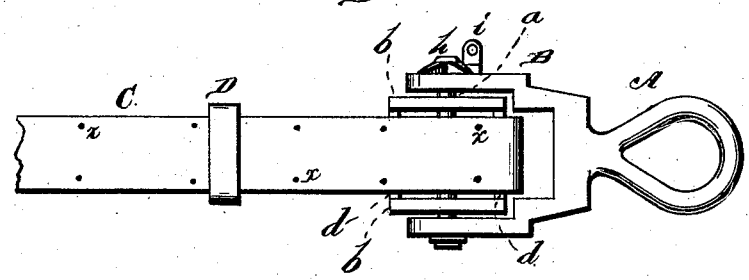
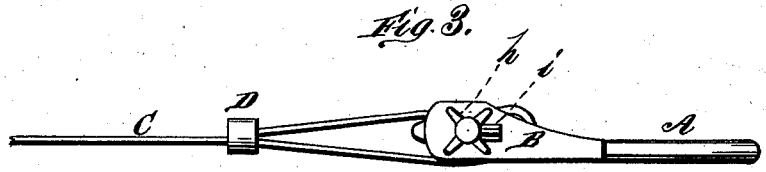
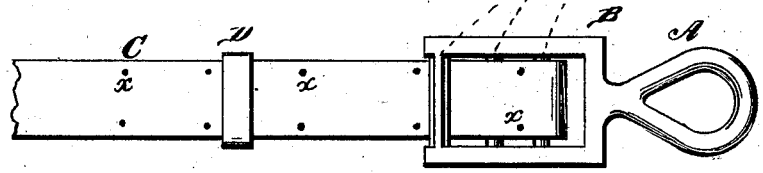
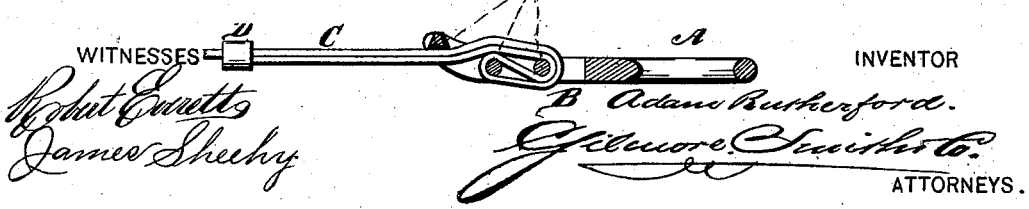

UNITED STATES PATENT OFFICE.

ADAM RUTHERFORD, OF WALLA WALLA, WASHINGTON TERRITORY.

IMPROVEMENT IN ADJUSTABLE TRACE-FASTENINGS.

Specification forming part of Letters Patent No. 203,780, dated May 14, 1878; application filed December 1, 1877.

*To all whom it may concern:*

Be it known that I, ADAM RUTHERFORD, of Walla Walla, in the county of Walla Walla and Territory of Washington, have invented a new and valuable Improvement in Trace-Fasteners; and I do hereby declare that the following is a full, clear, and exact description of the construction and operation of the same, reference being had to the annexed drawings, making a part of this specification, and to the letters and figures of reference marked thereon.

Figure 1 of the drawings is a representation of plan view of my trace-fastener. Fig. 2 is a longitudinal vertical section. Fig. 3 is a side view. Fig. 4 is a modification plan view, and Fig. 5 is a longitudinal vertical sectional view thereof.

The nature of my invention consists in the construction of a trace-fastener; the object being to lengthen or shorten the trace at the whiffletree instead of at the hame-tug, as is now usual, thereby dispensing with the ordinary trace-buckle, as will be hereinafter more fully set forth.

The annexed drawings, to which reference is made, fully illustrate my invention.

A represents the ordinary cockeye, usually fastened to the rear end of a trace for attaching the same to the whiffletree.

My improved cockeye is formed with a frame, B, forming two jaws, through which passes a shaft, $a$, and on this shaft are secured two arms, $b\ b$, the ends of which are connected by rods $d\ d$, as shown.

C represents the trace, the extreme rear end of which is provided with a loop, D, passing around the trace. The trace is passed around the shaft $a$, and then passed around the rods $d$, as shown, and the body of the trace then passed through the loop D, and the strain of the trace in passing around the shaft and rod $a\ d$ causes it to bind and hold.

On one end of the shaft $a$, outside of the frame B, is a star-wheel, $h$, and when the trace is adjusted a screw, $i$, is inserted in the frame between the arms of the star, thus preventing the interior frame from rotating. The trace can easily be lengthened or shortened, as required, by slipping around the shaft and rod $a\ d$.

The above is intended for heavy draft. For light draft the frame B is simply provided with three stationary rods or cross-bars, $d$, around which the trace is wound, as shown.

The trace is provided with impressions or other marks, as shown at $x\ x$, for the purpose of indicating and regulating the distance the teamster may want to change the length of his trace.

By this invention I dispense with the ordinary trace-buckle, and change the length of the trace at the whiffletree instead of at the hame-tug.

What I claim as new, and desire to secure by Letters Patent, is—

1. The cockeye A provided with the frame B, having a series of cross-bars, $d$, therein, in combination with the trace C, having a loop, D, on its extreme end, substantially as and for the purposes set forth.

2. The combination of the cockeye A, frame B, shaft $a$ with star-wheel $h$, and arms $b\ b$, the rods $d\ d$, and screw $i$, all substantially as and for the purposes set forth.

In testimony that I claim the above I have hereunto subscribed my name in the presence of two witnesses.

ADAM RUTHERFORD.

Witnesses:
 REEVES AYRES,
 R. GUICHARD.